United States Patent
Srinivasan et al.

(10) Patent No.: US 12,393,593 B2
(45) Date of Patent: Aug. 19, 2025

(54) PRIORITY-DRIVEN FEDERATED QUERY-BASED DATA CACHING

(71) Applicant: Optum, Inc., Minnetonka, MN (US)

(72) Inventors: Srivatsan Srinivasan, Lake Stevens, WA (US); Priyadarshni Natarajan, Redmond, WA (US); John Jose Anto Gerard Arokiasamy, Chaska, MN (US)

(73) Assignee: Optum, Inc., Minnetonka, MN (US)

( * ) Notice: Subject to any disclaimer, the term of this patent is extended or adjusted under 35 U.S.C. 154(b) by 12 days.

(21) Appl. No.: 18/465,576

(22) Filed: Sep. 12, 2023

(65) Prior Publication Data

US 2025/0086186 A1 Mar. 13, 2025

(51) Int. Cl.
*G06F 16/24* (2019.01)
*G06F 16/2455* (2019.01)
*G06F 16/25* (2019.01)

(52) U.S. Cl.
CPC ...... *G06F 16/24561* (2019.01); *G06F 16/256* (2019.01)

(58) Field of Classification Search
CPC .......... G06F 16/24561; G06F 16/256
See application file for complete search history.

(56) References Cited

U.S. PATENT DOCUMENTS

| | | | |
|---|---|---|---|
| 1,372,871 | A | 3/1921 | Droll |
| 6,901,403 | B1 | 5/2005 | Bata et al. |
| 6,950,823 | B2 | 9/2005 | Amiri et al. |
| 7,403,956 | B2 | 7/2008 | Vaschillo et al. |

(Continued)

FOREIGN PATENT DOCUMENTS

| | | |
|---|---|---|
| WO | 2011/155743 A2 | 12/2011 |
| WO | 2012/007745 A2 | 1/2012 |

(Continued)

OTHER PUBLICATIONS

Anaissi, et al., "A Personalized Federated Learning Algorithm: An Application in Anomaly Detection", (10 pages), Nov. 5, 2021, arXiv:2111.02627v1.

(Continued)

*Primary Examiner* — Merilyn P Nguyen
(74) *Attorney, Agent, or Firm* — Alston & Bird LLP

(57) ABSTRACT

Various embodiments of the present disclosure provide federated query processing techniques for monitoring data access patterns through federated queries and intelligently caching disparate data segments based on the data access patterns. The techniques include determining a relative priority for a data segment of a third-party data source based on a plurality of federated queries. Each of the plurality of federated queries may reference data segments from a plurality of disparate data sources. The relative priority may be indicative of a priority of the data segment relative to other data segments. In response to a determination that the relative priority satisfies a priority threshold, the techniques include storing a data segment in an intermediary local data source and initiating the performance of a data segment redirect configured to redirect a subsequent federated query associated with the data segment to the intermediary local data source.

19 Claims, 6 Drawing Sheets

(56) References Cited

U.S. PATENT DOCUMENTS

| | | | |
|---|---|---|---|
| 7,831,594 | B2 | 11/2010 | Mehta et al. |
| 7,945,581 | B2 | 5/2011 | Bayliss et al. |
| 8,341,104 | B2 | 12/2012 | Manickam et al. |
| 8,515,975 | B1 | 8/2013 | Federici |
| 8,539,345 | B2 | 9/2013 | Appleyard et al. |
| 8,572,031 | B2 | 10/2013 | Merriman et al. |
| 8,762,406 | B2 | 6/2014 | Ho et al. |
| 8,930,410 | B2 | 1/2015 | Alton et al. |
| 9,116,812 | B2 | 8/2015 | Joshi et al. |
| 9,246,776 | B2 | 1/2016 | Ellsworth et al. |
| 9,390,112 | B1 | 7/2016 | Daly et al. |
| 9,489,440 | B2 | 11/2016 | Stritzel et al. |
| 9,558,230 | B2 | 1/2017 | Hollifield et al. |
| 9,600,504 | B2 | 3/2017 | Marrelli et al. |
| 9,646,226 | B2 | 5/2017 | Wang et al. |
| 10,185,728 | B2 | 1/2019 | Nath et al. |
| 10,229,161 | B2 | 3/2019 | Kakarla et al. |
| 10,296,524 | B1 | 5/2019 | Tung et al. |
| 10,409,802 | B2 | 9/2019 | Spitz et al. |
| 10,698,954 | B2 | 6/2020 | Piechowicz et al. |
| 10,719,301 | B1 | 7/2020 | Dasgupta et al. |
| 10,762,539 | B2 | 9/2020 | Murugesan et al. |
| 10,795,598 | B1* | 10/2020 | Vohra .................... G06F 3/0649 |
| 10,817,483 | B1 | 10/2020 | Samdani et al. |
| 10,867,063 | B1 | 12/2020 | Avanes et al. |
| 10,872,236 | B1 | 12/2020 | Elor et al. |
| 10,896,176 | B1 | 1/2021 | Creedon et al. |
| 10,908,926 | B2 | 2/2021 | Coven et al. |
| 11,074,107 | B1 | 7/2021 | Nandakumar |
| 11,093,500 | B2 | 8/2021 | Gladwin et al. |
| 11,094,029 | B2 | 8/2021 | Kalamkar et al. |
| 11,100,420 | B2 | 8/2021 | Dirac et al. |
| 11,113,784 | B2 | 9/2021 | Ray et al. |
| 11,119,980 | B2 | 9/2021 | Szczepanik et al. |
| 11,126,632 | B2 | 9/2021 | Pal et al. |
| 11,157,470 | B2 | 10/2021 | Schuetz |
| 11,204,851 | B1 | 12/2021 | Iyengar et al. |
| 11,281,673 | B2 | 3/2022 | Nanda et al. |
| 11,301,467 | B2 | 4/2022 | Slezak et al. |
| 11,321,330 | B1* | 5/2022 | Pandis ................. G06F 16/2471 |
| 11,475,350 | B2 | 10/2022 | McMahan et al. |
| 11,550,812 | B2 | 1/2023 | Liu et al. |
| 11,636,108 | B1* | 4/2023 | Xu ........................ G06F 16/256 |
| | | | 707/714 |
| 2004/0153435 | A1 | 8/2004 | Gudbjartsson et al. |
| 2006/0218149 | A1 | 9/2006 | Patrick |
| 2006/0259977 | A1 | 11/2006 | Patrick |
| 2008/0104089 | A1 | 5/2008 | Pragada et al. |
| 2012/0210066 | A1 | 8/2012 | Joshi et al. |
| 2012/0290592 | A1 | 11/2012 | Ishii |
| 2012/0317096 | A1 | 12/2012 | Kaufmann et al. |
| 2013/0086039 | A1* | 4/2013 | Salch ................. G06F 16/2455 |
| | | | 707/E17.131 |
| 2013/0132360 | A1 | 5/2013 | Kuznetsov et al. |
| 2013/0159288 | A1 | 6/2013 | Nikankin |
| 2015/0169685 | A1 | 6/2015 | Elias et al. |
| 2015/0193697 | A1 | 7/2015 | Vasseur et al. |
| 2016/0147888 | A1 | 5/2016 | Nguyen et al. |
| 2017/0013046 | A1 | 1/2017 | Flynn |
| 2017/0220605 | A1 | 8/2017 | Nivala et al. |
| 2017/0269921 | A1 | 9/2017 | Martin Vicente et al. |
| 2017/0329466 | A1 | 11/2017 | Krenkler et al. |
| 2018/0293276 | A1 | 10/2018 | Bae et al. |
| 2018/0375720 | A1 | 12/2018 | Yang et al. |
| 2019/0050459 | A1 | 2/2019 | Griffith et al. |
| 2019/0065569 | A1 | 2/2019 | Boutros et al. |
| 2019/0146978 | A1 | 5/2019 | Beedgen et al. |
| 2019/0196890 | A1* | 6/2019 | Bucchi .................. G06F 16/951 |
| 2019/0311372 | A1 | 10/2019 | Lindner |
| 2019/0369969 | A1 | 12/2019 | Donohoe et al. |
| 2019/0392296 | A1 | 12/2019 | Brady et al. |
| 2020/0034742 | A1 | 1/2020 | Dirac et al. |
| 2020/0050612 | A1 | 2/2020 | Bhattacharjee et al. |
| 2020/0082010 | A1 | 3/2020 | Bodziony et al. |
| 2020/0117434 | A1 | 4/2020 | Biskup et al. |
| 2020/0202171 | A1 | 6/2020 | Hughes et al. |
| 2020/0226012 | A1 | 7/2020 | Pitre et al. |
| 2020/0250525 | A1 | 8/2020 | Kumar Addepalli et al. |
| 2020/0319877 | A1 | 10/2020 | Glazer et al. |
| 2020/0320379 | A1 | 10/2020 | Watson et al. |
| 2020/0349161 | A1 | 11/2020 | Siddiqui et al. |
| 2020/0401891 | A1 | 12/2020 | Xu et al. |
| 2021/0019665 | A1 | 1/2021 | Gur et al. |
| 2021/0081837 | A1 | 3/2021 | Polleri et al. |
| 2021/0097343 | A1 | 4/2021 | Goodsitt et al. |
| 2021/0174164 | A1 | 6/2021 | Hsieh et al. |
| 2021/0286657 | A1 | 9/2021 | Mathur et al. |
| 2021/0294577 | A1 | 9/2021 | Dunn et al. |
| 2021/0304362 | A1 | 9/2021 | Palmaro et al. |
| 2021/0334651 | A1 | 10/2021 | Leng et al. |
| 2021/0390455 | A1 | 12/2021 | Schierz et al. |
| 2022/0067181 | A1 | 3/2022 | Carley |
| 2022/0078264 | A1 | 3/2022 | Mathur |
| 2022/0086393 | A1 | 3/2022 | Peters et al. |
| 2022/0091837 | A1 | 3/2022 | Chai et al. |
| 2022/0108177 | A1 | 4/2022 | Samek et al. |
| 2022/0114451 | A1 | 4/2022 | Muñoz et al. |
| 2022/0129581 | A1 | 4/2022 | Jones et al. |
| 2022/0138561 | A1 | 5/2022 | Prendki |
| 2022/0172040 | A1 | 6/2022 | Kazi et al. |
| 2022/0245176 | A1 | 8/2022 | Weisman |
| 2022/0269691 | A1 | 8/2022 | Liu et al. |
| 2022/0269706 | A1 | 8/2022 | Balasubramanian et al. |
| 2022/0300850 | A1 | 9/2022 | Mendez et al. |
| 2022/0374914 | A1 | 11/2022 | Morrill et al. |
| 2022/0407861 | A1 | 12/2022 | Beecham et al. |
| 2023/0152994 | A1* | 5/2023 | Jiang ..................... G06F 3/0679 |
| | | | 711/154 |
| 2023/0315731 | A1 | 10/2023 | Xu et al. |
| 2023/0325389 | A1* | 10/2023 | Fan ......................... G06F 21/62 |
| 2023/0418468 | A1* | 12/2023 | Shah ..................... G06F 3/0604 |
| 2024/0078333 | A1 | 3/2024 | Lim et al. |
| 2024/0134842 | A1 | 4/2024 | Kim et al. |
| 2024/0320231 | A1 | 9/2024 | Bhattacharjee et al. |

FOREIGN PATENT DOCUMENTS

| | | |
|---|---|---|
| WO | 2021/144803 A1 | 7/2021 |
| WO | 2022/185324 A1 | 9/2022 |
| WO | 2022/269526 A1 | 12/2022 |
| WO | 2023/248204 A1 | 12/2023 |

OTHER PUBLICATIONS

Cai, et al., "The Challenges of Data Quality and Data Quality Assessment in the Big Data Era", Data Science Journal, vol. 14, pp. 1-10, May 15, 2015, DOI: http://dx.doi.org/10.5334/dsj-2015-002.

Cohen, Yoav, "Introducing Universal Masking", satori, (7 pages), Nov. 11, 2020, Retrieved on https://blog.satoricyber.com/introducing-universal-masking/.

Costa, et al., "A Survey on Data-Driven Performance Tuning for Big Data Analytics Platforms", Big Data Research, vol. 25, (17 pages), Jan. 27, 2021.

Debattista, et al., "A Methodology and Framework for Linked Data Quality Assessment", ACM Journal of Data and Information Quality, vol. 4, (29 pages), Jan. 2016, DOI: http://dx.doi.org/10.1145/0000000.0000000.

Devarajan, et al., "Acceleration via Multi-Tiered Data Buffering and Prefetching", Journal of Computer Science and Technology, vol. 35, pp. 92-120, Jan. 2020, DOI: 10.1007/s11390-020-9781-1.

Einziger, et al., "A Highly Efficient Cache Admission Policy", (24 pages), Dec. 3, 2015, arXiv:1512.00727v2.

Fuhl, et al., "Explainable Online Validation of Machine Learning Models for Practical Applications", (9 pages), Jan. 17, 2021, arXiv:2010.00821v3.

Hirano, et al., "RanSAP:An Open Dataset of Ransomware Storage Access Patterns for Training Machine Learning Models", Forensic Science International: Digital Investigation, vol. 40, (22 pages), Dec. 16, 2021, https://www.sciencedirect.com/science/article/pii/S2666281721002390.

(56) References Cited

OTHER PUBLICATIONS

Immuta, "Immuta Architecture: Dive Deeper into the Platform", (9 pages), Jan. 3, 2023, Retrieved from https://www.immuta.com/product/architecture/.

Jain et al., "Efficient Execution of Quantized Deep Learning Models: A Compiler Approach", (12 pages), Jun. 18, 2020, arXiv:2006.10226v1.

Janardhanan, PS, "Project Repositories for Machine Learning with TensorFlow", ScienceDirect, vol. 171, pp. 188-196, (2020).

Jin, Lei, "Software-Oriented Distributed Shared Cache Management for Chip Multiprocessors", University of Pittsburgh, (133 pages), 2010, http://d-scholarship.pitt.edu/8834/1/Lei.Jin.08.15.2010.PhD.Thesis.pdf.

Kopp, Andreas, "Practical Federated Learning with Azure Machine Learning", Towards Data Science, (21 pages), Aug. 17, 2022, https://towardsdatascience.com/practical-federated-learning-with-azure-machine-learning-8807f9bd1a7e.

Masolo, Claudio, "Google's BigQuery Introduces col. Level Encryption Functions and Dynamic Masking of Information", InfoQ, (6 pages), Jul. 7, 2022, Retrieved from https://www.infoq.com/news/2022/07/google-bigquery-encryption/.

Pollok, et al., "Open Fabric for Deep Learning Models", IBM Research, (5 pages), 2018, Retrieved at https://openreview.net/pdf?id=SkgCTFpV2X.

Rivie' Res, et al., "Eclipse: A Platform for Integrating Development Tools", IBM Systems Journal, (14 pages), Jan. 2004, DOI: 10.1147/sj.432.0371.

Schwarz, et al., "Augmenting Web Pages and Search Results to Support Credibility Assessment", CHI 2011, (10 pages), May 7, 2011, https://juliaschwarz.net/assets/web-credibility/schwarz-chi11-web-credibility.

Snowflake, "Understanding Dynamic Data Masking", (1 page), Jan. 4, 2023, Retrieved from https://docs.snowflake.com/en/user-guide/security-column-ddm.html.

Vasilache, et al., "Tensor Comprehensions: Framework-Agnostic High-Performance Machine Learning Abstractions", (37 pages), Jun. 29, 2018, arXiv:1802.04730v3.

Witt, et al., "Predictive Performance Modeling for Distributed Computing Using Black-Box Monitoring and Machine Learning", Elsevier, (19 pages), May 30, 2018, arXiv:1805.11877v1.

Yates, et al., "Age-Optimal Constrained Cache Updating", IEEE International Symposium on Information Theory, (5 pages), 2017.

Final Rejection Mailed on Oct. 31, 2024 for U.S. Appl. No. 18/365,485, 10 page(s).

Non-Final Rejection Mailed on May 28, 2024 for U.S. Appl. No. 18/365,485, 9 page(s).

Non-Final Rejection Mailed on Sep. 28, 2024 for U.S. Appl. No. 18/462,846, 12 page(s).

Notice of Allowance and Fees Due (PTOL-85) Mailed on Nov. 5, 2024 for U.S. Appl. No. 18/242,954, 2 page (s).

Notice of Allowance and Fees Due (PTOL-85) Mailed on Oct. 2, 2024 for U.S. Appl. No. 18/242,954, 2 page (s).

Notice of Allowance and Fees Due (PTOL-85) Mailed on Sep. 10, 2024 for U.S. Appl. No. 18/242,954, 14 page (s).

Advisory Action (PTOL-303) Mailed on Jan. 24, 2025 for U.S. Appl. No. 18/365,485, 2 page(s).

Notice of Allowance and Fees Due (PTOL-85) Mailed on Mar. 7, 2025 for U.S. Appl. No. 18/365,485, 8 page(s).

Notice of Allowance and Fees Due (PTOL-85) Mailed on Mar. 19, 2025 for U.S. Appl. No. 18/365,485, 5 page(s).

Non-Final Rejection Mailed on Apr. 30, 2025 for U.S. Appl. No. 18/365,494, 11 page(s).

Final Rejection Mailed on Jun. 10, 2025 for U.S. Appl. No. 18/462,846, 11 page(s).

Notice of Allowance and Fees Due (PTOL-85) Mailed on Jun. 10, 2025 for U.S. Appl. No. 18/365,485, 5 page(s).

* cited by examiner

PRIORITY-DRIVEN FEDERATED QUERY-BASED DATA CACHING

BACKGROUND

Various embodiments of the present disclosure address technical challenges related to federated query processing techniques given limitations of existing federated query engines. Conventional federated query engines resolve complex queries across a number of disparate remote data sources by repeatedly pulling data segments from the disparate remote data sources. At times, portions of remote data sources may be manually identified and stored in a local cache. This may improve the performance (e.g., speed, efficiency, and computing power expenditure, etc.) of a federated query engine by reducing network and data query lag times involved with accessing data from a remote sources. To optimize the performance of a federated query engine, cached data segments should include segments of data that are most frequently accessed by a plurality of federated queries. Identifying these segments presents challenges for traditional federated query engines because federated queries may include complex sequences of query operations, each of which may involve a different segment of data that is not readily identifiable. Various embodiments of the present disclosure make important contributions to existing federated query engines by addressing these technical challenges.

BRIEF SUMMARY

Various embodiments of the present disclosure provide federated query processing techniques that leverage a plurality of federated queries to identify and track data access patterns for data segments stored across a plurality of disparate, third-party, data sources. To do so, a federated query may be parsed to create a syntax tree that may be used to identify query operations from the federated query that reference a unique data segment. The unique data segment may be associated with a hash and used to determine a query count for particular segments of data across a plurality of third-party data sources. The query count may be leveraged to determine a relative priority for a data segment for use in a priority-driven federated query-based data caching scheme. By doing so, some embodiments of the present disclosure provide improved query processing techniques to overcome the technical challenges of conventional federated query engines.

In some embodiments, a computer-implemented method includes determining, by one or more processors, a relative priority for a data segment of a third-party data source based on a plurality of federated queries, wherein each of the plurality of federated queries references one or more data segments from a plurality of third-party data sources, and wherein the relative priority is indicative of a priority of the data segment relative to the one or more data segments; and in response to a determination that the relative priority satisfies a priority threshold, (i) storing, by the one or more processors, the data segment in an intermediary local data source; and (ii) initiating, by the one or more processors, the performance of a data segment redirect configured to redirect a subsequent federated query associated with the data segment to the intermediary local data source.

In some embodiments, a computing apparatus includes a memory and one or more processors communicatively coupled to the memory. The one or more processors are configured to: determine a relative priority for a data segment of a third-party data source based on a plurality of federated queries, wherein each of the plurality of federated queries references one or more data segments from a plurality of third-party data sources, and wherein the relative priority is indicative of a priority of the data segment relative to the one or more data segments; and in response to a determination that the relative priority satisfies a priority threshold, (i) store the data segment in an intermediary local data source; and (ii) initiate the performance of a data segment redirect configured to redirect a subsequent federated query associated with the data segment to the intermediary local data source.

In some embodiments, one or more non-transitory computer-readable storage media include instructions that, when executed by one or more processors, cause the one or more processors to: determine a relative priority for a data segment of a third-party data source based on a plurality of federated queries, wherein each of the plurality of federated queries references one or more data segments from a plurality of third-party data sources, and wherein the relative priority is indicative of a priority of the data segment relative to the one or more data segments; and in response to a determination that the relative priority satisfies a priority threshold, (i) store the data segment in an intermediary local data source; and (ii) initiate the performance of a data segment redirect configured to redirect a subsequent federated query associated with the data segment to the intermediary local data source.

DETAILED DESCRIPTION

Figure 1:
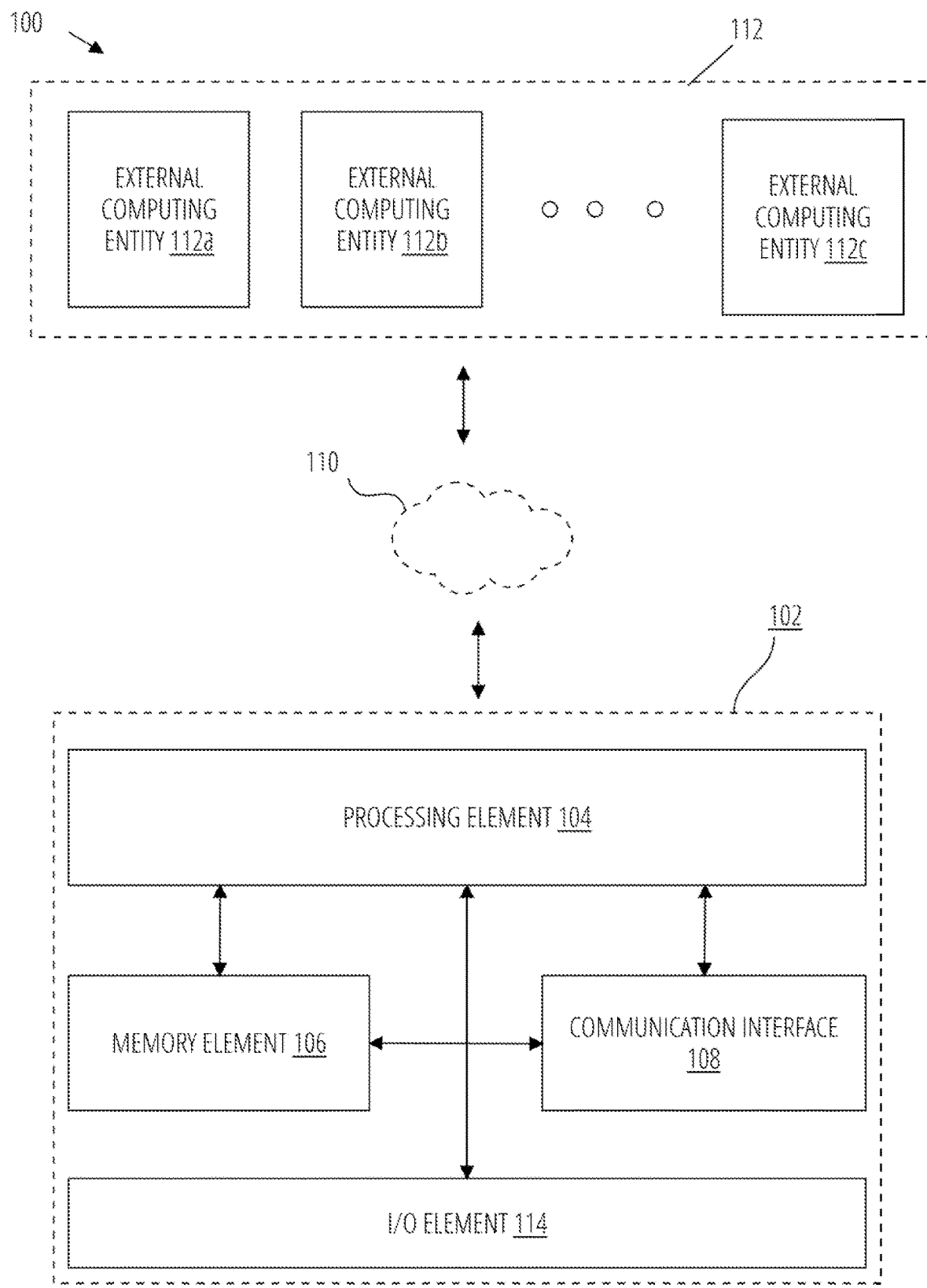
FIG. 1 illustrates an example computing system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

II. Example Framework

FIG. 1 illustrates an example computing system 100 in accordance with one or more embodiments of the present disclosure. The computing system 100 may include a predictive computing entity 102 and/or one or more external computing entities 112a-c communicatively coupled to the predictive computing entity 102 using one or more wired and/or wireless communication techniques. The predictive computing entity 102 may be specially configured to perform one or more steps/operations of one or more techniques described herein. In some embodiments, the predictive computing entity 102 may include and/or be in association with one or more mobile device(s), desktop computer(s), laptop(s), server(s), cloud computing platform(s), and/or the like. In some example embodiments, the predictive computing entity 102 may be configured to receive and/or transmit one or more datasets, objects, and/or the like from and/or to the external computing entities 112a-c to perform one or more steps/operations of one or more techniques (e.g., federated query processing techniques, data prioritization techniques, and/or the like) described herein.

The external computing entities 112a-c, for example, may include and/or be associated with one or more third-party data sources that may be configured to receive, store, manage, and/or facilitate a data catalog that is accessible to the predictive computing entity 102. By way of example, the predictive computing entity 102 may include a federated query system that is configured to access data segments from across one or more of the external computing entities 112a-c to resolve a complex, federated query. The external computing entities 112a-c, for example, may be associated with one or more data repositories, cloud platforms, compute nodes, and/or the like, that may be individually and/or collectively leveraged by the predictive computing entity 102 to resolve a federated query.

The predictive computing entity 102 may include, or be in communication with, one or more processing elements 104 (also referred to as processors, processing circuitry, digital circuitry, and/or similar terms used herein interchangeably) that communicate with other elements within the predictive computing entity 102 via a bus, for example. As will be understood, the predictive computing entity 102 may be embodied in a number of different ways. The predictive computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the predictive computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like may be used to control certain aspects of the operation of the predictive computing entity 102 with the assistance of the processing element 104.

As indicated, in one embodiment, the predictive computing entity 102 may also include one or more communication interfaces 108 for communicating with various computing entities, e.g., external computing entities 112a-c, such as by communicating data, content, information, and/or similar terms used herein interchangeably that may be transmitted, received, operated on, processed, displayed, stored, and/or the like.

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
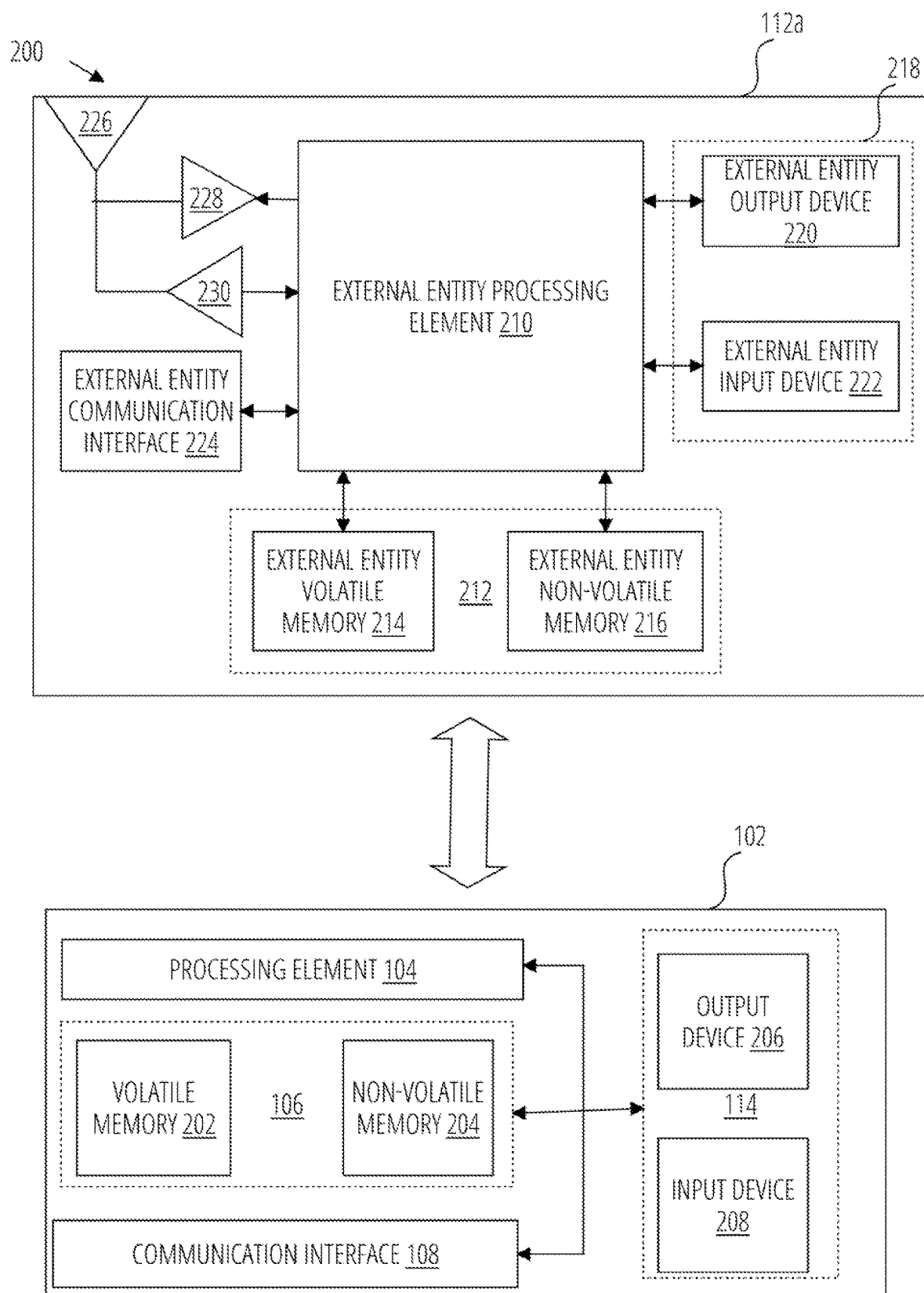
FIG. 2 is a schematic diagram showing a system computing architecture in accordance with some embodiments discussed herein.

FIG. 2 is a schematic diagram showing a system computing architecture 200 in accordance with some embodiments discussed herein. In some embodiments, the system computing architecture 200 may include the predictive computing entity 102 and/or the external computing entity 112a of the computing system 100. The predictive computing entity 102 and/or the external computing entity 112a may include a computing apparatus, a computing device, and/or any form of computing entity configured to execute instructions stored on a computer-readable storage medium to perform certain steps or operations.

The predictive computing entity 102 may include a processing element 104, a memory element 106, a communication interface 108, and/or one or more I/O elements 114 that communicate within the predictive computing entity 102 via internal communication circuitry, such as a communication bus and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices, and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry, and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The memory element 106 may include non-volatile memory 204 (also referred to as non-volatile storage, memory, memory storage, memory circuitry, and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the predictive computing entity 102 to perform one or more step/operations described herein.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

The predictive computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The predictive computing entity 102 may include one or more I/O elements 114. The I/O elements 114 may include one or more output devices 206 and/or one or more input devices 208 for providing and/or receiving information with a user, respectively. The output devices 206 may include one or more sensory output devices, such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices 208 may include one or more sensory input devices, such as one or more tactile input devices (e.g., touch sensitive displays, push buttons, and/or the like), one or more audio input devices (e.g., microphones, and/or the like), and/or the like.

In addition, or alternatively, the predictive computing entity 102 may communicate, via a communication interface 108, with one or more external computing entities such as the external computing entity 112a. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the predictive computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112a may include an external entity processing element 210, an external entity memory element 212, an external entity communication interface 224, and/or one or more external entity I/O elements 218 that communicate within the external computing entity 112a via internal communication circuitry, such as a communication bus and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112a may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112a may be capable of operating with one or more air interface standards, communication protocols, modulation types, and access types. More particularly, the external computing entity 112a may operate in accordance with any of a number of wireless communication standards and protocols, such as those described above with regard to the predictive computing entity 102.

Via these communication standards and protocols, the external computing entity 112a may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112a may also download changes, add-ons, and updates, for instance, to its firmware, software (e.g., including executable instructions, applications, program modules), operating system, and/or the like.

According to one embodiment, the external computing entity 112a may include location determining embodiments, devices, modules, functionalities, and/or the like. For example, the external computing entity 112a may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data, such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating a position of the external computing entity 112a in connection with a variety of other systems, including cellular towers, Wi-Fi access points, and/or the like. Similarly, the external computing entity 112a may include indoor positioning embodiments, such as a location module adapted to acquire, for example, latitude, longitude, altitude, geocode, course, direction, heading, speed, time, date, and/or various other information/ data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112a to interact with and/or cause the display, announcement, and/or the like of information/data to a user. The user input interface may include any of a number of input devices or interfaces allowing the external computing entity 112a to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112a and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. Examples of Certain Terms

In some embodiments, the term "first-party" refers to a computing entity that is associated with a query-based action. The first-party may include a computing system, platform, and/or device that is configured to initiate a query to one or more third-party data sources. For example, the first-party may include a first-party platform that is configured to leverage data from one or more disparate data sources to perform a computing action. The first-party platform may include a machine learning processing platform configured to facilitate the performance of one or machine learning models, a data processing platform configured to process, monitor, and/or aggregate large datasets, and/or the like. To improve computing efficiency and enable the aggregation of data across multiple disparate datasets, the first-party may generate federated queries that reference datasets from multiple third-parties and submit the federated queries to one intermediary query processing service configured to efficiently receive the queried data from the third-parties and return the data to the first-party. In some examples, the first-party may have access to a query routine set (e.g., software development kit (SDK), etc.) that may be leveraged to wrap a query submission, acknowledgment, status polling, and result fetching application programming interfaces (APIs) to deliver a synchronous experience between the first-party and the intermediary query processing service.

In some embodiments, the term "federated query" refers to a data entity that represents a query to a plurality of disparate, third-party data sources. The federated query may include a logical query statement that defines a plurality of query operations for receiving and processing data from multiple, different, third-party data sources.

In some embodiments, the term "query operation" refers to a data entity that represents a portion of a federated query. A query operation may include data expression, such as a structured query language (SQL) expression, that may represent a primitive computing task for executing a portion of a federated query. A query operation, for example, may include a search/scan operation for receiving data from a third-party data source, a join operation for joining two data segments, and/or the like.

In some embodiments, the term "third-party data source" refers to a data storage entity configured to store, maintain, and/or monitor a data catalog. A third-party data source may include a heterogenous data store that is configured to store a data catalog using specific database technologies, such as Netezza, Teradata, and/or the like. A data store, for example, may include a data repository, such as a database, and/or the like, for persistently storing and managing collections of structured and/or unstructured data (e.g., catalogs, etc.). A third-party data source may include an on-prem data store including one or more locally curated data catalogs. In addition, or alternatively, a third-party data source may include a remote data store including one or more cloud-based data lakes, such as Vulcan, Level2, and/or the like. In some examples, a third-party data source may be built on specific database technologies that may be incompatible with one or more other third-party data sources. Each of the third-party data sources may define a data catalog that, in some use cases, may include data segments that could be aggregated to perform a computing task.

In some embodiments, the term "data segment" refers to a portion of a third-party computing source. A data segment, for example, may include a segment of a data catalog corresponding to a third-party computing resource. In some examples, a data segment may include a data table stored by a third-party data source. In addition, or alternatively, the data segment may include a portion of the data table. By way of example, the data segment may include one or more index ranges, columns, rows, and/or combinations thereof of a third-party data source.

In some embodiments, the term "federated query system" refers to a computing entity that is configured to perform an intermediary query processing service between a first-party and a plurality third-party data sources. The federated query system may define a single point of consumption for a first-party. The federated query system may leverage a federated query engine to enable analytics by querying data where it is maintained (e.g., third-party data sources, etc.), rather than building complex extract, transform, and load (ETL) pipelines.

In some embodiments, the term "intermediary local data source" refers to a data storage entity configured to store, maintain, and/or monitor portions of one or more third-party data sources. An intermediary local data source may include a local data store, such as a local cache, and/or the like, that is configured to temporarily store one or more data segments from one or more third-party data sources. By way of example, the intermediary local data source may include one or more cache memories, each configured store and/or maintain a result dataset for a temporary time duration. In some examples, the intermediary local data source may be leveraged with one or more data prioritization techniques of the present disclosure to intelligently retrieve and store prioritized data.

In some embodiments, the term "relative priority" refers to a data metric that represents an importance of a respective data segment relative to a plurality of data segments across a plurality of third-party data sources. A relative priority for a respective data segment may be leveraged to identify one or more hotspots of data activity. A hotspot, for example, may identify a frequently queried data segment that is accessed (e.g., through a plurality of federated queries, etc.) at a higher rate relative to other data segments. The relative priority may be based on data access patterns over one or more time periods. For instance, a relative priority may be based on a query count for a respective data segment.

In some embodiments, the term "query count" refers to a data entity that represents a number of queries associated with a data segment over a time duration. For example, the query count may describe a historical number of queries that reference a respective data segment over a time duration. In some examples, the historical number of queries may be associated with a time range. The time range may include a time duration preceding a current time such that the query count is dynamically updated based on the current time. In addition, or alternatively, the time range may include a time window with a particular start time and end time.

In some embodiments, the term "data-based priority" refers to a data metric that represents a first portion of a relative priority for a data segment. The data-based priority, for example, may be based on a query count for a data segment irrespective of any time-constraints. For instance, the data-based priority may be indicative of a degree of priority for the data segment relative to other data segments of the plurality of third-party data sources. The data-based priority may be based on an access frequency for the data segment at one or more times.

In some embodiments, the term "time-based priority" refers to a data metric that represents a second portion of a relative priority for a data segment. The time-based priority, for example, may be based on a timing of a query count for a data segment. For instance, the time-based priority may be indicative of a time period corresponding to the data-based priority. The time-based priority may identify a time range corresponding to an increased data-based priority, a decreased data-based priority, and/or the like.

In some embodiments, the term "syntax tree" refers to a data entity that represents a parsed federated query. A syntax tree may include a tree data structure, such as directed acyclic graph (DAG), and/or the like, that includes a plurality of nodes and a plurality of edges connecting one or more of the plurality of nodes. Each of the plurality of nodes may correspond to a query operation for executing a federated query. The plurality of edges may define a sequence for executing each query operation represented by the plurality of nodes. By way of example, a federated query may be parsed to extract a plurality of interdependent query operations from a federated query. The plurality of interdependent query operations may include computing functions that may rely on an input from a previous computing function and/or provide an input to a subsequent computing function. As one example, a first, data scan, function may be performed to retrieve a data segment before a second, data join, function is performed using the data segment. The syntax tree may include a plurality of nodes and/or edges that define the query operations (e.g., the nodes) and the relationships (e.g., the edges) between each of the query operations of a federated query.

In some embodiments, the term "leaf node" refers to a data entity that represents a portion of a syntax tree. A leaf node may represent independent query operations (e.g., nodes) of the federated query. The independent query operations may represent search/scan operations for receiving data from a third-party data source. Each leaf node may describe a particular data segment that is referenced by a federated query.

In some embodiments, the term "segment hash" refers to a unique identifier for a data segment. In some examples, the segment hash may include a random hashed value for uniquely identifying the data segment. The segment hash may be generated by applying a hashing function to a table name path for a data segment and/or a query operation corresponding to the data segment. By way of example, a segment hash for a data segment that includes a data table from a third-party data source may be based on a table name path of the data table. In addition, or alternatively, a segment hash for a data segment corresponding to a first portion (e.g., one or more columns, rows, etc.) of a data table from a third-party data source may be based on a query operation for retrieving the first portion from the data table.

In some embodiments, the term "table name path" refers to a data entity that represents a qualifiable table name for a data table. A table name path, for example, may identify a third-party data source, a schema, and a table name for a data table.

In some embodiments, the term "hashing function" refers to a data entity that describes parameters, hyper-parameters, and/or defined operations of an algorithm configured to generate a hashed value from an unhashed value. The hashing function may include any type of hashing algorithm, such as MD5, SHA-1, SHA-2, SHA-3, among others. The hashing function may be applied to a table name path, a query operation, and/or any other representation of a data segment to generate a unique hashed identifier for the data segment.

In some embodiments, the term "catalog service" refers to a computing entity that is configured to identify a mapping between a data segment and a third-party data source. For example, the catalog service may maintain a table name path for each data table associated with (e.g., registered with, etc.) the federated query system. In some examples, the catalog service may maintain a current state for a federated query system. The current state may be indicative of a plurality of historical segment hashes corresponding to a plurality of recently queried data segments and/or one or more query counts for each of the historical segment hashes.

In some embodiments, the term "historical segment hashes" refer to segment hashes for previously queried data segments. For example, a historical segment hash may be generated for a data segment after the data segment is queried for a first time (e.g., within a time period, such as one or more hours, days, weeks, etc.). The historical segment hash may be stored as a part of a current state of a federated query system to maintain a record (e.g., query count, etc.) for a respective data segment of a federated query.

In some embodiments, the term "data segment redirect" refers to a computing action configured to redirect a query for a data segment based on the intermediary local data source. In some examples, a data segment redirect may include modifying the mapping between the data segment and the third-party data source. For example, the data segment redirect may include modifying a current state for a federated query system to map a data segment to a local location corresponding to an intermediary local data source.

In some examples, a data segment redirect may include modifying a federated query. For example, a data segment redirect may modify references to a respective data segment to point to the local location.

IV. Overview, Technical Improvements, and Technical Advantages

Embodiments of the present disclosure present federated query processing techniques that improve traditional federated query engines by identifying and intelligently handling data access patterns across a plurality of disparate data sources. The federated query processing techniques may be leveraged to monitor data access patterns to granular segments of data stored across a plurality of disparate data sources. To do so, some embodiments of the present disclosure may identify and tag individual, granular, data segments that are referenced by a federated query. Each granular data segment, for example, may include a discrete unit of data, such as a data table, one or more rows, columns, and/or the like, that is stored on a remote data source. Some techniques of the present disclosure enable the identification of each data segment associated with a particular federated query by parsing the federated query to generate a syntax tree. The syntax tree may then be processed to identify each of the referenced data segments. Once identified, the data segments may be hashed to generate a unique identifier that may be used to track a number of queries that reference each of the data segments.

By tracking access patterns through federated queries, some embodiments of the present disclosure enable the determination of a relative priority for a segment of data that is relative to different segments of data stored by a particular remote data source and/or segments of data stored by other, disparate, data sources. These relative priorities allow for the intelligent identification of data hotspots across an entire ecosystem of remote data sources. Some techniques of the present disclosure may leverage these insights to dynamically cache individual segments of data within a local data source, such as a local cache, to optimize computing performance. Once locally stored, federated queries that reference a particular data segment may be redirected to a respective local source. In this manner, some embodiments of the present disclosure improve the performance of traditional federated query engines by optimizing the use of local data source based on current and/or anticipated access patterns.

Example inventive and technologically advantageous embodiments of the present disclosure include: (i) parsing techniques for identifying data segments from a federated query; (ii) hashing techniques for tracking access patterns corresponding to granular data segments within a plurality of disparate third-party data sources; and/or (iii) data evaluation techniques for intelligently caching data segments for a federated query engine.

V. Example System Operations

As indicated, various embodiments of the present disclosure make important technical contributions to federated query processing technology. In particular, systems and methods are disclosed herein that implement federated query processing techniques for tracking, monitoring, and handling data access patterns across a plurality of disparate data sources. Unlike traditional query techniques, the query processing techniques of the present disclosure leverage federated queries to generate new data priorities that are agnostic to the location at which a data segment is stored.

Figure 3:
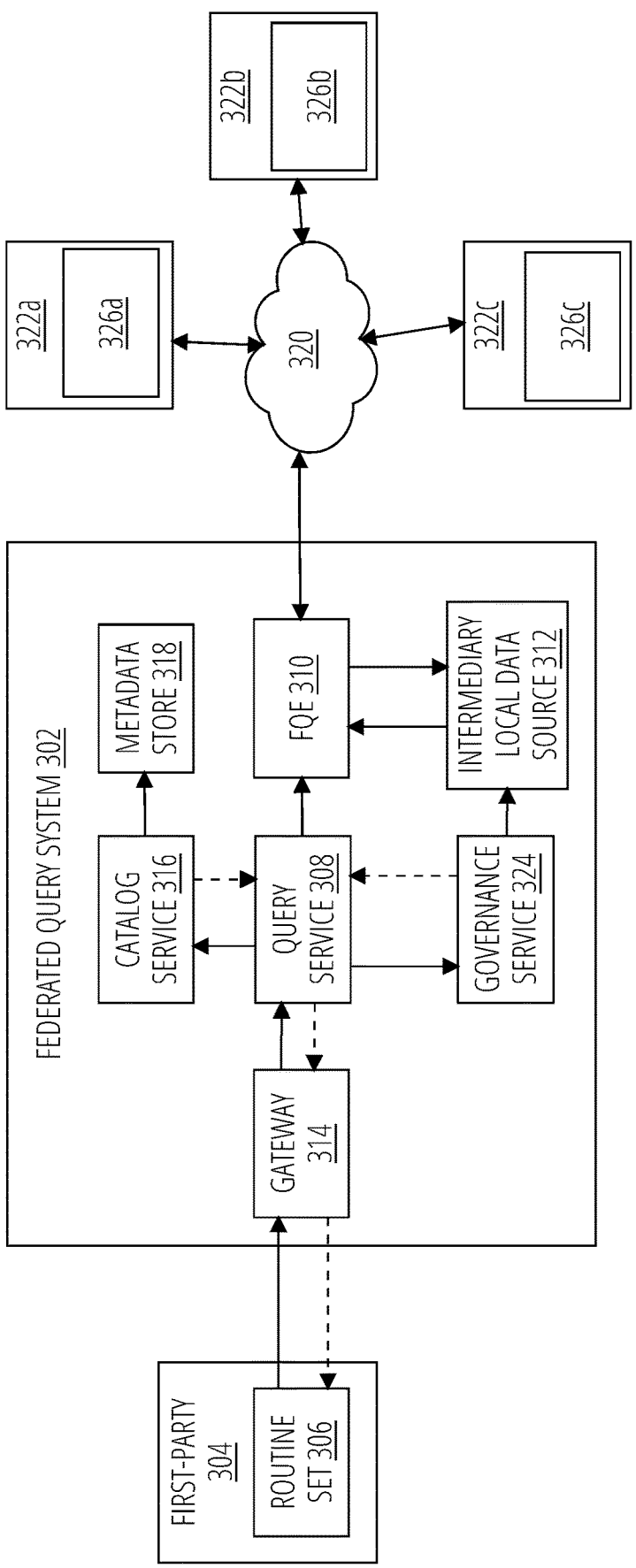
FIG. 3 is a system diagram showing example computing entities for facilitating a federated query service in accordance with some embodiments discussed herein.

FIG. 3 is a system diagram 300 showing example computing entities for facilitating a federated query service in accordance with some embodiments discussed herein. The system diagram 300 includes a first-party 304, a federated query system 302, and a plurality of third-party data sources 322a-c. The federated query system 302 may be configured to facilitate a plurality of computing functionalities to provide a seamless experience for the first-party 304, such as a data analytics and/or science user, to query and analyze data across the plurality of third-party data sources 322a-c without the need make duplicate copies of the data. Using some of the techniques of the present disclosure, the federated query system 302 optimizes data store coverage, speed of analytics, and correctness of data to provide a near real time experience for all analytical use cases.

In some embodiments, the federated query system 302 is a computing entity that is configured to perform an intermediary query processing service between the first-party 304 and the plurality of third-party data sources 322a-c. The federated query system 302 may define a single point of consumption for a first-party 304. The federated query system 302 may leverage a federated query engine to enable analytics by querying data where it is maintained (e.g., third-party data sources, etc.), rather than building complex ETL pipelines.

In some embodiments, the first-party 304 accesses the federated query system 302 to initiate a federated query to one or more of the plurality of third-party data sources 322a-c. For example, the first-party 304 may leverage a routine set 306 for the federated query system 302 to submit a federated query to the federated query system 302. The federated query system 302 may include a network gateway 314 for securely receiving the federated query. The network gateway 314 may verify and/or route the federated query to the query service 308. The network gateway 314, for example, may include an API gateway.

In some embodiments, the first-party 304 is a computing entity that is associated with a query-based action. The first-party may include a computing system, platform, and/or device that is configured to initiate a query to one or more of the plurality of third-party data sources 322a-c. For example, the first-party 304 may include a first-party platform that is configured to leverage data from one or more disparate data sources to perform a computing action. The first-party platform may include a machine learning processing platform configured to facilitate the performance of one or machine learning models, a data processing platform configured to process, monitor, and/or aggregate large datasets, and/or the like.

To improve computing efficiency and enable the aggregation of data across multiple disparate datasets, the first-party 304 may generate federated queries that reference datasets from multiple third-parties and submit the federated queries to one intermediary query processing service (e.g., federated query system 302) configured to efficiently receive the queried data from the third-parties and return the data to the first-party 304. In some examples, the first-party 304 may have access to a query routine set (e.g., SDK, etc.) that may be leveraged to wrap a query submission, acknowledgment, status polling, and/or result fetching APIs to deliver a synchronous experience between the first-party 304 and the intermediary query processing service.

In some embodiments, a federated query is a data entity that represents a query to a plurality of third-party data sources 322a-c. The federated query may include a logical query statement that defines a plurality of query operations for receiving and processing data from multiple, different, third-party data sources 322a-c. In some examples, the federated query may be generated using one or more query functionalities of the routine set 306.

In some embodiments, a query operation is a data entity that represents a portion of a federated query. A query operation may include data expression, such as an SQL expression, that may represent a primitive computing task for executing a portion of a federated query. A query operation, for example, may include a search/scan operation for receiving data from a third-party data source, a join operation for joining two data segments, and/or the like.

In some embodiments, a third-party data source is a data storage entity configured to store, maintain, and/or monitor a data catalogue. A third-party data source may include a heterogenous data store that is configured to store a data catalogue using specific database technologies, such as Netezza, Teradata, and/or the like. A data store, for example, may include a data repository, such as a database, and/or the like, for persistently storing and managing collections of structured and/or unstructured data (e.g., catalog, etc.). A third-party data source may include an on-premise data store including one or more locally curated data catalog. In addition, or alternatively, a third-party data source may include a remote data store including one or more cloud-based data lakes, such as Vulcan, Level2, and/or the like. In some examples, a third-party data source may be built on specific database technologies that may be incompatible with one or more other third-party data sources. Each of the third-party data sources may define a data catalogue that, in some use cases, may include data segments that could be aggregated to perform a computing task.

By way of example, the federated query system 302 may be associated with a plurality of third-party data sources 322a-c that may include a first third-party data source 322a, a second third-party data source 326b, a third third-party data source 322c, and/or the like. Each of the plurality of third-party data sources 322a-c may include a standalone, incompatible, data source. The first third-party data source 322a, for example, may include a first third-party dataset 326a that is separate from a second third-party data source 326b and/or a third third-party dataset 326c of the second third-party data source 322b and third third-party data source 322c, respectively. Each of the plurality of third-party data sources 322a-c may include any type of data source. As an example, the first third-party data source 322a may include a first cloud-based dataset, the second third-party data source 322b may include an on-premises dataset, the third third-party data source 322c may include a second cloud-based dataset, and/or the like.

In some embodiments, the query service 308 receives a federated query from the first-party 304 through the network gateway 314. The query service 308 may perform one or more operations to facilitate the optimal generation of a result set in response to the federated query. To do so, the query service 308 may leverage one or more sub-components of the federated query system 302. The one or more sub-components may include the federated query engine 310, the catalog service 316, the governance service 324, the intermediary local data source 312, the metadata store 318, and/or the like.

In some embodiments, the federated query engine 310 is a computing entity that is configured to execute federated queries across heterogenous data store technologies. The federated query engine 310 may be configured to implement an execution strategy to generate an optimal execution plan for a federated query. The execution plan may define a sequence of operations, a timing for the sequence of operations, and/or other contextual information for optimally executing a complex federated query. The federated query engine 310, may leverage optimization techniques, such as Predicate and Limit pushdown, Column-Pruning, Join re-ordering, Parallelization, and/or other cost-based optimization techniques to arrive at an execution strategy of the joins, aggregations, and/or the like.

The federated query engine 310 may be configured to leverage a massively parallel processing (MPP) architecture to simultaneously execute multiple portions of a federated query to optimize computing performance. For example, the federated query engine 310 may schedule one or more portions of the execution plan for execution across one or more distinct compute nodes which then connect to the plurality of third-party data sources 322a-c to execute parts of splits of the execution plan on the plurality of third-party data sources 322a-c. In this manner, a result set may be generated across multiple compute nodes and then transferred back to the executor (worker) nodes which processes intermediate results.

In some embodiments, the catalog service 316 is a computing entity that is configured to identify a mapping between a data segment and a third-party data source. For example, the catalog service 316 may maintain a table name path for each data table associated with (e.g., registered with, etc.) the federated query system 302. By way of example, the plurality of third-party data sources 322a-c may be previously registered with the federated query system 302. During registration, the catalog service 316 may be modified to include a mapping to each data table of a respective data catalog of a third-party data source. The mapping may include a table name path that identifies a path for accessing a particular table of a third-party data source.

In some embodiments, a table name path is a data entity that represents a qualifiable table name for a data table. A table name path, for example, may identify a third-party data source, a schema, and/or a table name for the data table. The table name may include a third-party defined name. In some examples, the table name may correspond to one or more table name aliases defined by the third-party and/or one or more other entities. The catalog service 316 may record the table name path, the table name, and/or any table name aliases for a respective data table.

In some examples, the mapping for a respective data table may be modifiable to redirect a request to a data table. For instance, the catalog service 316 may be configured to communicate with the plurality of third-party data sources 322a-c to maintain a current mapping for each data table of the plurality of third-party data sources 322a-c. In addition, or alternatively, the catalog service 316 may interact with the query service 308 to redirect a request to a data table, and/or portion thereof, to an intermediary local data source as described herein.

In some embodiments, the catalog service 316 maintains a metadata store 318 that includes metadata for each of the plurality of third-party data sources 322a-c. The metadata store 318 may be populated for each of the plurality of third-party data sources 322a-c during registration. The metadata may include access parameters (e.g., security credentials, data access controls, etc.), performance attributes (e.g., historical latency, data quality, etc.), access trends, and/or the like for each of the plurality of third-party data sources 322a-c.

In some examples, the catalog service 316 may maintain a current state for a federated query system 302. The current state may be indicative of a plurality of historical segment hashes corresponding to a plurality of recently queried data segments and/or one or more query counts for each of the historical segment hashes. In some examples, the plurality of historical segment hashes may identify one or more locally stored data segments that are currently stored in one or more intermediary local data sources 312.

In some embodiments, the federated query system 302 includes a governance service 324 configured to manage access to the intermediary local data source 312. The governance service 324, for example, may include a computing entity that is configured to authorize and/or audit access to one or more local and/or remote data assets. The governance service 324 may define governance criteria for data classification, usage rights, and/or access controls to intermediary local data source 312 and/or the plurality of third-party data sources 322a-c.

In some embodiments, the intermediary local data source 312 refers to a data storage entity configured to store, maintain, and/or monitor portions of the plurality of third-party data sources 322a-c. An intermediary local data source 312 may include a local data store, such as a local cache, and/or the like, that is configured to temporarily store one or more data segments from one or more of the plurality of third-party data sources 322a-c. By way of example, the intermediary local data source 312 may include one or more cache memories, each configured store and/or maintain a data segment and/or a result dataset for a temporary time duration. In some examples, the intermediary local data source 312 may be leveraged with one or more data prioritization techniques of the present disclosure to intelligently retrieve and store prioritized data.

In some embodiments, the query service 308 is configured to facilitate a priority driven data caching scheme for intelligently prioritizing and caching data segments within the intermediary local data source 312. An example of a priority driven data caching scheme will now further be described with reference to FIG. 4.

Figure 4:
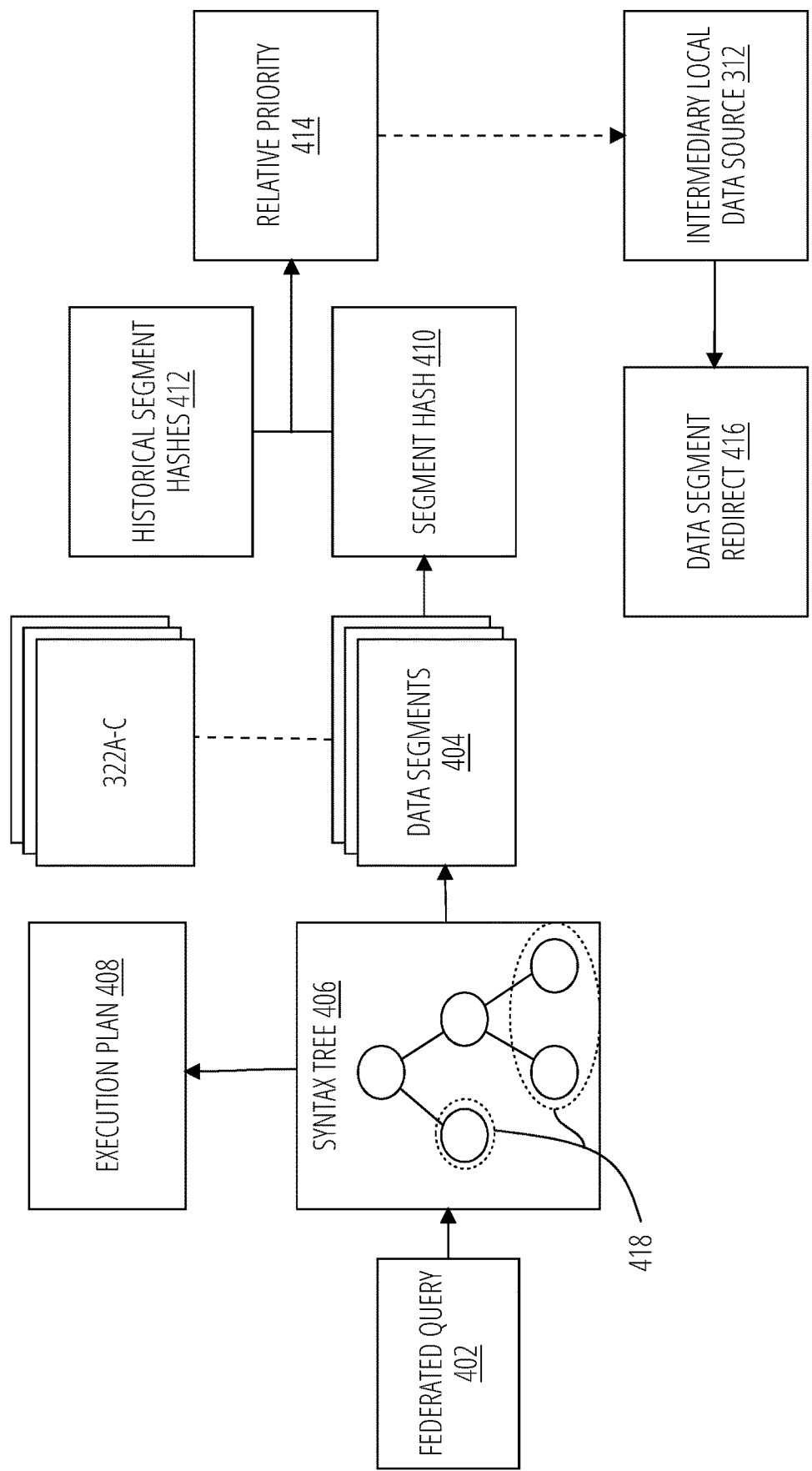
FIG. 4 is a dataflow diagram showing example data structures for facilitating a priority driven data caching scheme in accordance with some embodiments discussed herein.

FIG. 4 is a dataflow diagram 400 showing example data structures for facilitating a priority driven data caching scheme in accordance with some embodiments discussed herein. The dataflow diagram 400 depicts a set of data structures and computing entities for prioritizing a plurality of data segments 404 across a plurality of third-party data sources 322a-c by monitoring data access patterns from a plurality of federated queries.

In some embodiments, a federated query 402 is received that references a plurality of data segments 404. For example, each of the data segments 404 may be referenced by one or more query operations of the federated query 402.

In some embodiments, a data segment is a portion of a third-party computing source. A data segment, for example, may include a segment of a data catalog corresponding to a third-party computing resource. In some examples, a data segment may include a data table stored by a third-party data source. In addition, or alternatively, the data segment may include a portion of the data table. By way of example, the data segment may include one or more index ranges, columns, rows, and/or combinations thereof of a third-party data source.

In some examples, each of the data segments 404 may be identified from the query operations of the federated query 402 to monitor data access patterns to various portions of each of the plurality of third-party data sources 322a-c. In some examples, the data segments 404 may be identified based on a syntax tree 406. For example, a syntax tree 406 may be generated for the federated query 402.

In some embodiments, the syntax tree 406 is a data entity that represents a parsed federated query. The syntax tree 406 may include a tree data structure, such as directed acyclic graph (DAG), and/or the like, that includes a plurality of nodes and a plurality of edges connecting one or more of the plurality of nodes. Each of the plurality of nodes may correspond to a query operation for executing at least a portion of the federated query 402. The plurality of edges may define a sequence for executing each query operation represented by the plurality of nodes. By way of example, the federated query 402 may be parsed to extract a plurality of interdependent query operations from the federated query 402. The plurality of interdependent query operations may include computing functions that may rely on an input from a previous computing function and/or provide an input to a subsequent computing function. As one example, a first, data scan, function may be performed to retrieve a data segment before a second, data join, function is performed using the data segment. The syntax tree 406 may include a plurality of nodes and/or edges that define the query operations (e.g., the nodes) and the relationships (e.g., the edges) between each of the query operations of the federated query 402.

In some embodiments, the syntax tree 406 is used to generate an execution plan 408 for generating a result set for the federated query 402. For example, the syntax tree 406 may define a plurality of subqueries, aggregations, and/or the functions (e.g., query operations, etc.) for resolving the federated query 402. The syntax tree 406 may be converted to a logical plan in the form of hierarchical nodes that denote the flow of input from various sub-nodes. The resulting logical plan may be optimized in accordance with an execution strategy to generate an execution plan 408 for the federated query 402.

In some embodiments, the plurality of data segments 404 are identified based on the syntax tree 406. By way of example, the plurality of nodes may include one or more leaf nodes 418. In some embodiments, a leaf node is a data entity that represents a portion of the syntax tree 406. The leaf nodes 418 may represent independent query operations (e.g., nodes) of the federated query 402. The independent query operations may represent search/scan operations for receiving data from a third-party data source. By way of example, a leaf node of the one or more leaf nodes may correspond to a scan or projection operation for accessing a respective data segment. Each leaf node may describe a particular data segment that is referenced by the federated query 402. In some examples, the data segments 404 may be identified based on the leaf nodes 418 of the federated query 402.

Once identified, the data segments may be recorded to detect one or more data access patterns. The data access patterns may be leveraged to determine a relative priority 414 for each of the data segments 404. The relative priority 414, for example, may be determined for a data segment of a third-party data source based on a plurality of federated queries. For instance, as described herein, each of the federated queries may reference one or more data segments from the plurality of third-party data sources 322a-c. The data segments may be identified from each federated query and recorded to detect the one or more data access patterns.

In some embodiments, the relative priority 414 is a data metric that represents an importance of a respective data segment relative to a plurality of data segments across the plurality of third-party data sources 322a-c. The relative priority 414 for a respective data segment may be leveraged to identify one or more hotspots of data activity. A hotspot, for example, may identify a frequently queried data segment that is accessed (e.g., through a plurality of federated queries, etc.) at a higher rate relative to other data segments. The relative priority 414 may be based on data access patterns over one or more time periods. For instance, a relative priority may be based on a query count for a respective data segment.

In some embodiments, a query count is a data entity that represents a number of queries associated with a data segment over a time duration. For example, the query count may describe a historical number of queries that reference a respective data segment over a time duration. In some examples, the historical number of queries may be associated with a time range. The time range may include a time duration preceding a current time such that the query count is dynamically updated based on the current time. In addition, or alternatively, the time range may include a time window with particular start and end times. The start and end times may include a time of day, a day of the week, week of the months, and/or the like.

In some embodiments, the relative priority 414 includes at least one of a data-based priority or a time-based priority. In some examples, the relative priority 414 may include both a data-based priority that identifies an access frequency for a data segment and a time-based priority that identifies a time period corresponding to the access frequency.

In some embodiments, the data-based priority is a data metric that represents a first portion of the relative priority 414 for a data segment. The data-based priority, for example, may be based on the query count for a data segment irrespective of any time-constraints. For instance, the data-based priority may be indicative of a degree of priority for the data segment relative to other data segments of the plurality of third-party data sources 322a-c. The data-based priority may be based on an access frequency for the data segment at one or more times.

In some embodiments, the time-based priority is a data metric that represents a second portion of the relative priority 414 for a data segment. The time-based priority, for example, may be based on a timing of a query count for a data segment. For instance, the time-based priority may be indicative of a time period corresponding to the data-based priority. The time-based priority may identify a time range corresponding to an increased data-based priority, a decreased data-based priority, and/or the like. In some examples, the data-based priority may be based on an access frequency for the data segment and the time period may correspond to an increased access frequency for the data segment.

In some embodiments, a plurality of segment hashes are generated to uniquely identify each of the data segments 404. For example, a hashing function may be individually applied to the data segments 404 to generate respective segment hash 410 for each of the data segments 404.

In some embodiments, a segment hash 410 is a unique identifier for a data segment. In some examples, the segment hash 410 may include a random hashed value for uniquely identifying the data segment. The segment hash 410 may be generated by applying a hashing function to a table name path for a data segment and/or a query operation corresponding to the data segment. By way of example, the segment hash 410 for a data segment that includes a data table from a third-party data source may be based on a table name path of the data table. In addition, or alternatively, the segment hash 410 for a data segment corresponding to a first portion (e.g., one or more columns, rows, etc.) of a data table from a third-party data source may be based on a query operation (e.g., a scan, etc.) for receiving the first portion from the data table.

For example, a data segment may include a data table stored by the third-party data source. In such a case, the table name path may be received (e.g., from a catalog service, etc.) for the data segment. The table name path may be derived from a query operation for scanning and/or projecting a data table. In some examples, the query operation may reference an alias for the table name path. In such a case, the alias may be compared to a local catalog database, such as a metadata store, to identify a standard table name path for the data table. The segment hash 410 for the data segment may be generated by applying the hashing function to the table name path. By way of example, the table name path may be provided as an input to the hashing function to receive a segment hash 410 for the data segment.

As another example, the data segment may include a first portion (e.g., columns, rows, etc.) of the data table stored by the third-party data source. In such a case, a query operation that is configured to receive the first portion of the data table may be identified from the syntax tree 406. The query operation, for example, may be associated with a leaf node of the syntax tree 406 and may include a scanning and/or projecting operation for the first portion from the data table. In some examples, an alias may be used to reference the data table. In such a case, the alias may be replaced with a standard table name path. The segment hash 410 for the data segment may be generated by applying the hashing function to the query operation. By way of example, the query operation may be provided as an input to the hashing function to receive a segment hash 410 for the data segment.

In some embodiments, the hashing function is a data entity that describes parameters, hyper-parameters, and/or defined operations of an algorithm configured to generate a hashed value from an unhashed value. The hashing function may include any type of hashing algorithm, such as MD5, SHA-1, SHA-2, SHA-3, among others. The hashing function may be applied to a table name path, a query operation, and/or any other representation of a data segment to generate a unique hashed identifier, such as the segment hash 410, for the data segment.

In some embodiments, the relative priority 414 for a data segment is determined based on the segment hash 410. For example, a query count for a data segment may be determined based on a comparison between the segment hash 410 corresponding to a data segment and a plurality of historical segment hashes 412 for the data segment.

In some embodiments, the historical segment hashes 412 are segment hashes for previously queried data segments. For example, a historical segment hash may be generated for a data segment after the data segment is queried for a first time (e.g., within a time period, such as one or more hours, days, weeks, etc.). The historical segment hash may be stored as a part of a current state of a federated query system to maintain a record (e.g., query count, etc.) for a respective data segment of a federated query 402.

In some embodiments, the query count for a data segment is determined by searching the historical segment hashes 412 to find a historical segment hash that corresponds (e.g., matches, etc.) to the segment hash 410.

In some examples, a historical segment hash from the plurality of historical segment hashes 412 may be identified that corresponds to the segment hash 410. In such a case, the query count may be determined by incrementing a historical query count corresponding to the historical segment hash. For example, the historical query count may be incremented by 1.

In some examples, a historical segment hash may not be identified from the historical segment hashes 412. For example, in response to a determination that the segment hash 410 is distinct from each of the plurality of historical segment hashes 412, the segment hash 410 may be stored (e.g., in a current state maintained by a catalog service, etc.) as a new historical segment hash. In some examples, a historical query count may be initialized for the historical segment hash and the query count may be determined by incrementing the historical query count. For example, the historical query count may be initialized as 0 and then incremented by 1 to determine the query count. In addition, or alternatively, the historical query count may be initialized as 1 and used as the query count (e.g., until incremented in response to another federated query).

In some embodiments, the query count for a data segment represents an access frequency for the data segment. In some examples, the relative priority 414 is determined based on the query count. For instance, the relative priority 414 may include a query count for a data segment relative to one or more query counts corresponding to one or more other data segments of the plurality of third-party data sources 322*a-c*. For example, the relative priority 414 may be the query count relative to an average, median, and/or the like query count for the other data segments. In this manner, the relative priority 414 for a data segment may be reflective of the access priority for the data segment with respect to the data segments accessible through a federated query system.

In some embodiments, one or more computing actions are performed in response to a determination that the relative priority 414 satisfies a priority threshold. For example, the data segment may be stored in an intermediary local data source 312 in response to the relative priority 414 satisfying the priority threshold. In addition, or alternatively, the performance of a data segment redirect 416 may be initiated in response to the relative priority 414 satisfying the priority threshold. For example, the data segment redirect may be configured to redirect a subsequent federated query associated with the data segment to the intermediary local data source 312.

In some embodiments, the priority threshold is a threshold query count indicative of a threshold number of historical federated queries associated with the data segment within a time period. For example, the priority threshold may be indicative of a particular data access frequency for the data segment. In some examples, the priority threshold may define a threshold query rate. The threshold query rate may be indicative of a query count over a particular time period. By way of example, the threshold query rate may include a number (e.g., hundred, thousand, etc.) of federated queries within a time period (e.g., an hour, day, etc.).

In some embodiments, the priority threshold is based on contextual attributes for a data segment. By way of example, the priority threshold may be based on a third-party data source that stores the data segment. For example, a priority threshold may be lower (e.g., a lower query rate) for third-party data sources associated with high latency, request response times, and/or the like. As another example, the priority threshold may be higher (e.g., a higher query rate) for third-party data sources associated with lower latency, request response times, and/or the like. In addition, or alternatively, the priority threshold may be based on other contextual attributes such as a data type of the data segment, a query complexity for receiving the data segment, and/or any other characteristic that may impact the accessibility of a data segment stored on at least one of the plurality of third-party data sources 322*a-c*.

In some embodiments, the intermediary local data source 312 is a cache memory that is configured for the data segment. An intermediary local data source 312 may be configured to temporarily store one or more portions of one or more data tables queried from the plurality of third-party data sources 322*a-c*. In some examples, the data segment may be stored in a newly configured intermediary local data source. For example, the intermediary local data source 312 may be configured in response to the data segment satisfying the priority threshold and the data segment may be stored within the newly configured intermediary local data source.

In addition, or alternatively, the data segment may be stored in a pre-configured intermediary local data source. For example, the intermediary local data source 312 may be preconfigured in response to one or more previous caching operations, one or more anticipated data segments, and/or the like. For example, in the event that the data segment is a first portion of a data table, the intermediary local data source 312 may have been preconfigured for a second portion of the data table. In some examples, the intermediary local data source 312 may include the second portion from the data table. The intermediary local data source 312 may be identified from a plurality of intermediary local data sources based on the data table. In response to identifying the intermediary local data source 312, the data segment may be stored in the intermediary local data source 312. In the event that none of the plurality of intermediary local data sources include a portion of the data table associated with a data segment, a new intermediary local data source 312 may be generated.

In some embodiments, the intermediary local data source 312 is preconfigured in anticipation of a data segment. For example, the intermediary local data source 312 may be preconfigured based on a time period corresponding to a data-based priority of the data segment. For instance, the time-based priority may identify one or more time periods during which the relative priority 414 of a data segment satisfies a priority threshold. In some examples, the intermediary local data source 312 may be generated before a respective time period to anticipate the further relative priority of the data segment. In some examples, the data segment may be preloaded into the intermediary local data source 312 and a data segment redirect 416 may be initiated before a respective time period to preemptively handle increased access frequencies.

In some embodiments, a data segment redirect 416 is a computing action configured to redirect a query for a data segment based on the intermediary local data source 312. In some examples, a data segment redirect 416 may include modifying the mapping between the data segment and a respective third-party data source. For example, the data segment redirect 416 may include modifying a current state for a federated query system to map a data segment to a local location corresponding to the intermediary local data source 312. In some examples, a data segment redirect 416 may include modifying a federated query. For example, a data segment redirect 416 may modify references to a respective data segment to point to the local location.

By way of example, initiating the performance of the data segment redirect 416 may include providing a data segment pointer for the data segment to a federated query engine. The data segment pointer may identify the intermediary local data source 312 for the data segment. In addition, or alternatively, initiating the performance of the data segment redirect 416 may include receiving a subsequent federated query that includes a reference to the data segment and modifying the reference to the data segment to identify the intermediary local data source 312.

Figure 5:
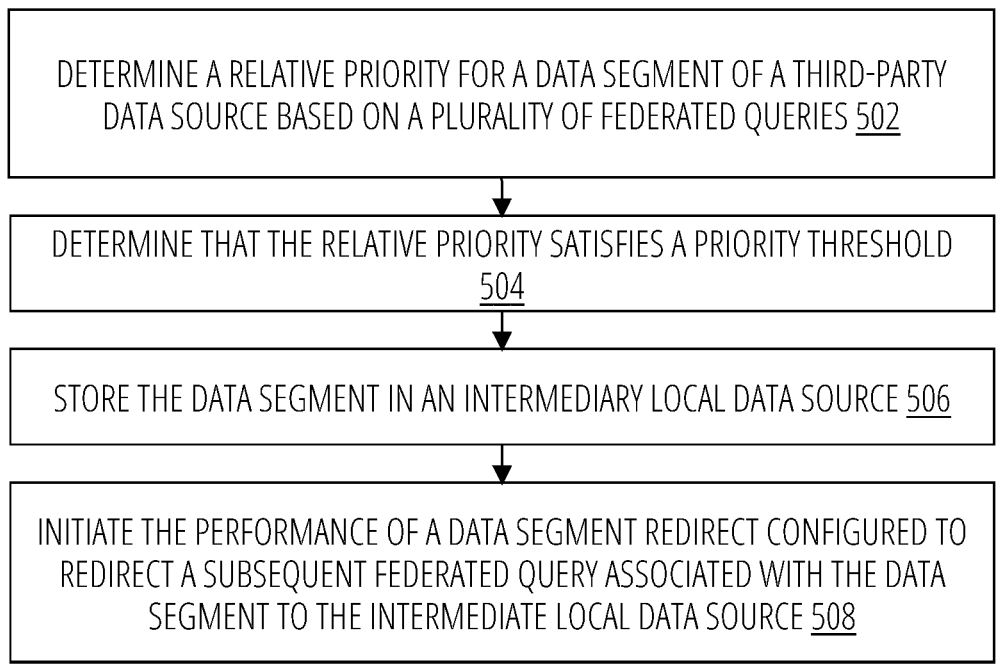
FIG. 5 is a flowchart showing an example of a process for priority-driven federated query-based data caching in accordance with some embodiments discussed herein.

FIG. 5 is a flowchart showing an example of a process 500 for priority-driven federated query-based data caching in accordance with some embodiments discussed herein. The flowchart depicts federated query processing techniques for caching individual segments of data to overcome various limitations of traditional federated query engines. The federated query processing techniques may be implemented by one or more computing steps/operations of the process 500, the computing system 100 may leverage the federated query processing techniques to overcome the various limitations with traditional federated query engines by identifying and tracking data segments referenced across a plurality of federated queries and intelligently storing segments of data in a local data cache based on data access patterns.

FIG. 5 illustrates an example process 500 for explanatory purposes. Although the example process 500 depicts a particular sequence of steps/operations, the sequence may be altered without departing from the scope of the present disclosure. For example, some of the steps/operations depicted may be performed in parallel or in a different sequence that does not materially impact the function of the process 500. In other examples, different components of an example device or system that implements the process 500 may perform functions at substantially the same time or in a specific sequence.

In some embodiments, the process 500 includes, at step/operation 502, determining a relative priority for a data segment of a third-party data source based on a plurality of federated queries. For example, the computing system 100 may determine the relative priority for the data segment. For instance, each of the federated queries may reference one or more data segments from a plurality of third-party data sources. The relative priority may be indicative of a priority of the data segment relative to the one or more data segments.

The relative priority may include at least one of a data-based priority and/or a time-based priority. The data-based priority may be indicative of a degree of priority for the data segment relative to other data segments of the plurality of third-party data sources. The time-based priority may be indicative of a time period corresponding to the data-based priority. In some examples, the data-based priority may be based on an access frequency for the data segment and the time period may correspond to an increased access frequency for the data segment.

In some embodiments, the process 500 includes, at step/operation 504, determining that the relative priority satisfies a priority threshold. For example, the computing system 100 may determine that the relative priority satisfies the priority threshold. The priority threshold may include a threshold query count indicative of a threshold number of historical federated queries associated with the data segment within a time period. The computing system 100 may perform one or more computing actions in response to the determination that the relative priority satisfies the priority threshold.

In some embodiments, the process 500 includes, at step/operation 506, storing the data segment in an intermediary local data source. For example, the computing system 100 may store the data segment in an intermediary local data source in response to the determination that the relative priority satisfies the priority threshold. In some examples, the data segment may include a first portion from a data table and the intermediary local data source may include a second portion from the data table. In such a case, the computing system 100 may identify the intermediary local data source from a plurality of intermediary local data sources based on the data table and, in response to identifying the intermediary local data source, store the data segment in the intermediary local data source.

The intermediary local data source may be a cache memory. In some examples, the computing system 100 may generate the intermediary local data source based on a time period corresponding to the data-based priority.

In some embodiments, the process 500 includes, at step/operation 508, initiating the performance of a data segment redirect configured to redirect a subsequent federated query associated with the data segment to the intermediary local data source. For example, the computing system 100 may initiate the performance of the data segment redirect in response to the determination that the relative priority satisfies the priority threshold. In some examples, the computing system 100 may provide a data segment pointer for the data segment to a federated query engine. The data segment pointer may identify the intermediary local data source for the data segment. In some examples, the computing system 100 may receive the subsequent federated query. The subsequent federated query may include a reference to the data segment. The computing system 100 may modify the reference to the data segment to identify the intermediary local data source.

Figure 6:
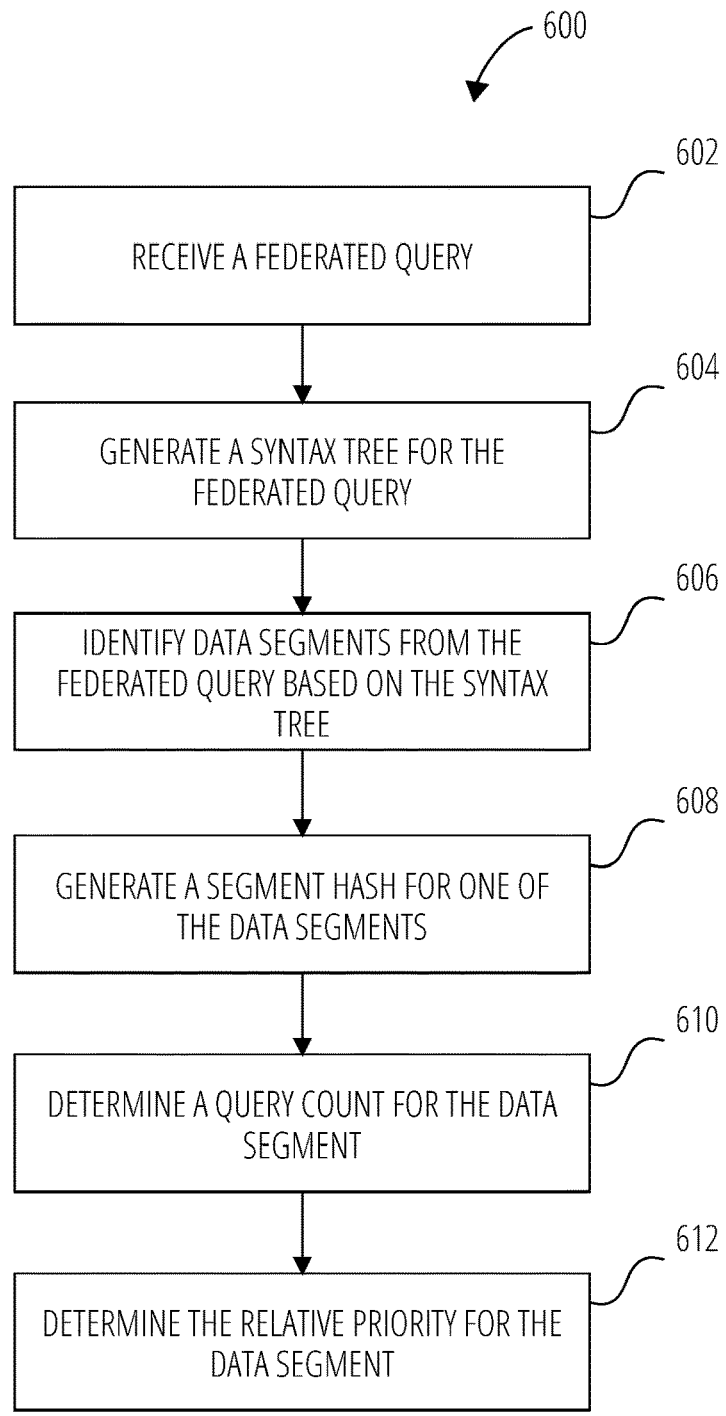
FIG. 6 is a flowchart showing an example of a process for determining a relative priority of a data segment referenced by a federated query in accordance with some embodiments discussed herein.

FIG. 6 is a flowchart showing an example of a process 600 for determining a relative priority of a data segment referenced by a federated query in accordance with some embodiments discussed herein. The flowchart depicts federated query processing techniques that overcome various limitations of traditional federated query engines that are unable to reliably track access patterns for data segments across a plurality of disparate data sources. The federated query processing techniques may be implemented by one or more computing steps/operations of the process 600, the computing system 100 may leverage the federated query processing techniques to overcome the various limitations with traditional federated query engines by identifying and tracking data segments referenced across a plurality of federated queries to identify data access patterns across a plurality of disparate data sources.

FIG. 6 illustrates an example process 600 for explanatory purposes. Although the example process 600 depicts a particular sequence of steps/operations, the sequence may be altered without departing from the scope of the present disclosure. For example, some of the steps/operations depicted may be performed in parallel or in a different sequence that does not materially impact the function of the process 600. In other examples, different components of an example device or system that implements the process 600 may perform functions at substantially the same time or in a specific sequence.

In some embodiments, the process 600 includes, at step/operation 602, receiving a federated query. For example, the computing system 100 may receive the federated query.

In some embodiments, the process 600 includes, at step/operation 604, generating a syntax tree for the federated query. For example, the computing system 100 may generate the syntax tree for the federated query. The syntax tree may include a plurality of nodes and a plurality of edges connecting one or more of the plurality of nodes. Each of the plurality of nodes may correspond to a query operation for executing the federated query. The plurality of edges may define a sequence for executing each query operation of the plurality of nodes. In some examples, the computing system 100 may determine the relative priority for a data segment based on the syntax tree.

In some embodiments, the process 600 includes, at step/operation 606, identifying a plurality of data segments based on the syntax tree. For example, the computing system 100 may identify the plurality of data segments associated with the federated query based on one or more leaf nodes of the syntax tree. For instance, the plurality of nodes of the syntax tree may include one or more leaf nodes. Each leaf node of the one or more leaf nodes may correspond to a scan and/or projection operation for accessing a respective data segment.

In some embodiments, the process 600 includes, at step/operation 608, generating a segment hash for at least one of the data segments. For example, the computing system 100 may generate, using a hashing function, the segment hash for the data segment. In some examples, the computing system may determine the relative priority for the data segment based on the one or more segment hashes.

In some examples, the data segment is a data table stored at the third-party data source and/or a first portion of the data table stored at the third-party data source. In the event that the data segment is the data table, the computing system 100 may receive a table name path for the data table and generate a segment hash for the data table by applying the hashing function to the table name path. In the event that the data segment is the first portion of the data table, the computing system 100 may receive a respective query operation for receiving the first portion from the data table and generate a segment hash for the first portion of the data table by applying the hashing function to the respective query operation.

In some embodiments, the process 600 includes, at step/operation 610, determining a query count for the data segment. For example, the computing system 100 may determine the query count for the data segment based on a comparison between a segment hash corresponding to the data segment and a plurality of historical segment hashes. For instance, the computing system 100 may identify a historical segment hash from the plurality of historical segment hashes that corresponds to the segment hash. The computing system 100 may identify a historical query count for the historical segment hash and determine the query count by incrementing the historical query count. In addition, or alternatively, in response to a determination that the segment hash is distinct from each of the plurality of historical segment hashes, the computing system 100 may store the segment hash as a historical segment hash. The computing system 100 may initialize a historical query count for the historical segment hash and determine the query count by incrementing the historical query count.

In some embodiments, the process 600 includes, at step/operation 612, determining the relative priority for the data segment. For example, the computing system 100 may determine the relative priority for the data segment based on the query count.

VI. Conclusion

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Example 1. A computer-implemented method, the computer-implemented method comprising: determining, by one or more processors, a relative priority for a data segment of a third-party data source based on a plurality of federated queries, wherein each of the plurality of federated queries references one or more data segments from a plurality of third-party data sources, and wherein the relative priority is indicative of a priority of the data segment relative to the one or more data segments; and in response to a determination that the relative priority satisfies a priority threshold, (i) storing, by the one or more processors, the data segment in an intermediary local data source; and (ii) initiating, by the one or more processors, the performance of a data segment redirect configured to redirect a subsequent federated query associated with the data segment to the intermediary local data source.

Example 2. The computer-implemented method of example 1, wherein determining the relative priority for the data segment comprises: generating a syntax tree for a federated query, wherein the syntax tree comprises a plurality of nodes and a plurality of edges connecting one or more of the plurality of nodes, wherein each of the plurality of nodes corresponds to a query operation for executing the federated query, and wherein the plurality of edges define a sequence for executing each query operation of the plurality of nodes; and determining the relative priority for the data segment based on the syntax tree.

Example 3. The computer-implemented method of example 2, wherein the plurality of nodes comprise one or more leaf nodes, and wherein determining the relative priority for the data segment comprises: identifying one or more data segments associated with the federated query based on the one or more leaf nodes; generating, using a hashing function, one or more segment hashes for the one or more data segments; and determining the relative priority for the data segment based on the one or more segment hashes.

Example 4. The computer-implemented method of example 3, wherein a leaf node of the one or more leaf nodes corresponds to a scan or projection operation for accessing a respective data segment.

Example 5. The computer-implemented method of any of examples 3 or 4 further comprising: determining a query count for the data segment based on a comparison between a segment hash corresponding to the data segment and a plurality of historical segment hashes; and determining the relative priority based on the query count.

Example 6. The computer-implemented method of example 5, wherein determining the query count comprises: identifying a historical segment hash from the plurality of historical segment hashes that corresponds to the segment hash; identifying a historical query count for the historical segment hash; and determining the query count by incrementing the historical query count.

Example 7. The computer-implemented method of any of examples 5 or 6, wherein determining the query count comprises: in response to a determination that the segment hash is distinct from each of the plurality of historical segment hashes, storing the segment hash as a historical segment hash; initializing a historical query count for the historical segment hash; and determining the query count by incrementing the historical query count.

Example 8. The computer-implemented method of any of examples 5 through 7, wherein the priority threshold comprises a threshold query count indicative of a threshold number of historical federated queries associated with the data segment within a time period.

Example 9. The computer-implemented method of any of examples 3 through 8, wherein the data segment is a data table stored at the third-party data source or a first portion of the data table stored at the third-party data source.

Example 10. The computer-implemented method of example 9, wherein the data segment is the data table, and wherein generating the one or more segment hashes comprises: receiving a table name path for the data table; and generating a segment hash for the data table by applying the hashing function to the table name path.

Example 11. The computer-implemented method of any of examples 9 or 10, wherein the data segment is the first portion of the data table, and wherein generating the one or more segment hashes comprises: receiving a respective query operation for receiving the first portion from the data table; and generating a segment hash for the first portion of the data table by applying the hashing function to the respective query operation.

Example 12. The computer-implemented method of example 11, wherein the intermediary local data source comprises a second portion from the data table, and wherein storing the data segment in the intermediary local data source comprises: identifying the intermediary local data source from a plurality of intermediary local data sources based on the data table; and in response to identifying the intermediary local data source, storing the data segment in the intermediary local data source.

Example 13. The computer-implemented method of any of the preceding examples, wherein the intermediary local data source is a cache memory.

Example 14. The computer-implemented method of any of the preceding examples, wherein: (i) the relative priority comprises at least one of a data-based priority or a time-based priority, (ii) the data-based priority is indicative of a degree of priority for the data segment relative to other data segments of the plurality of third-party data sources, and (iii) the time-based priority is indicative of a time period corresponding to the data-based priority.

Example 15. The computer-implemented method of example 14, wherein the data-based priority is based on an access frequency for the data segment, and wherein the time period corresponds to an increased access frequency for the data segment.

Example 16. The computer-implemented method of example 15, wherein storing the data segment in the intermediary local data source comprises: generating the intermediary local data source based on the time period corresponding to the data-based priority.

Example 17. The computer-implemented method of any of the preceding examples, wherein initiating the performance of the data segment redirect comprises: providing a data segment pointer for the data segment to a federated query engine, wherein the data segment pointer identifies the intermediary local data source for the data segment.

Example 18. The computer-implemented method of any of the preceding examples, wherein initiating the performance of the data segment redirect comprises: receiving the subsequent federated query, wherein the subsequent federated query comprises a reference to the data segment; and modifying the reference to the data segment to identify the intermediary local data source.

Example 19. A computing apparatus comprising memory and one or more processors communicatively coupled to the memory, the one or more processors configured to: determine a relative priority for a data segment of a third-party data source based on a plurality of federated queries, wherein each of the plurality of federated queries references one or more data segments from a plurality of third-party data sources, and wherein the relative priority is indicative of a priority of the data segment relative to the one or more data segments; and in response to a determination that the relative priority satisfies a priority threshold, (i) store the data segment in an intermediary local data source; and (ii) initiate the performance of a data segment redirect configured to redirect a subsequent federated query associated with the data segment to the intermediary local data source.

Example 20. One or more non-transitory computer-readable storage media including instructions that, when executed by one or more processors, cause the one or more processors to: determine a relative priority for a data segment of a third-party data source based on a plurality of federated queries, wherein each of the plurality of federated queries references one or more data segments from a plurality of third-party data sources, and wherein the relative priority is indicative of a priority of the data segment relative to the one or more data segments; and in response to a determination that the relative priority satisfies a priority threshold, (i) store the data segment in an intermediary local data source; and (ii) initiate the performance of a data segment redirect configured to redirect a subsequent federated query associated with the data segment to the intermediary local data source.

The invention claimed is:

1. A computer-implemented method comprising:
   determining, by one or more processors, a relative priority for a first data segment of a first third-party data source based on a federated query, wherein the federated query references a second data segment from a second third-party data source, and wherein the relative priority indicates a priority of the first data segment relative to the second data segment based on at least one of an access frequency for the first data segment or a time period corresponding to the access frequency; and
   in response to a determination that the relative priority satisfies a priority threshold,
   (i) storing, by the one or more processors, the first data segment in an intermediary local data source; and
   (ii) initiating, by the one or more processors, a performance of redirecting a subsequent federated query associated with the first data segment to the intermediary local data source.

2. The computer-implemented method of claim 1, wherein determining the relative priority for the first data segment comprises:
   generating a syntax tree for the federated query, wherein the syntax tree comprises a plurality of nodes and a plurality of edges connecting the plurality of nodes, wherein a node of the plurality of nodes corresponds to a query operation for executing the federated query, and the plurality of edges defines a sequence for executing a query operation of the plurality of nodes; and
   determining the relative priority for the first data segment based on the syntax tree.

3. The computer-implemented method of claim 2, wherein the plurality of nodes comprises at least one leaf node, and determining the relative priority for the first data segment comprises:

identifying the second data segment associated with the federated query based on the at least one leaf node;

generating, using a hashing function, a first segment hash for the first data segment and a second segment hash for the second data segment; and determining the relative priority for the first data segment based on the first segment hash and the second segment hash.

4. The computer-implemented method of claim 3, wherein the at least one leaf node corresponds to a scan operation or a projection operation for accessing the second data segment.

5. The computer-implemented method of claim 3 further comprising:

determining a query count for the first data segment based on a comparison between the first segment hash and a plurality of historical segment hashes; and determining the relative priority based on the query count.

6. The computer-implemented method of claim 5, wherein determining the query count comprises:

identifying a historical segment hash from the plurality of historical segment hashes that corresponds to the first segment hash;

identifying a historical query count for the historical segment hash; and determining the query count by incrementing the historical query count.

7. The computer-implemented method of claim 5, wherein determining the query count comprises:

in response to a determination that the first segment hash is distinct from the plurality of historical segment hashes, storing the first segment hash as a historical segment hash;

initializing a historical query count for the historical segment hash; and determining the query count by incrementing the historical query count.

8. The computer-implemented method of claim 5, wherein the priority threshold comprises a threshold query count that identifies a threshold number of historical federated queries associated with the first data segment within the time period.

9. The computer-implemented method of claim 3, wherein the first data segment is (i) a data table stored at the first third-party data source or (ii) a first portion of the data table stored at the first third-party data source.

10. The computer-implemented method of claim 9, wherein the first data segment is the data table, and wherein generating the first segment hash comprises:

receiving a table name path for the data table; and generating the first segment hash for the data table by applying the hashing function to the table name path.

11. The computer-implemented method of claim 9, wherein the first data segment is the first portion of the data table, and wherein generating the first segment hash comprises:

receiving a respective query operation for receiving the first portion from the data table; and generating a segment hash for the first portion of the data table by applying the hashing function to the respective query operation.

12. The computer-implemented method of claim 11, wherein the intermediary local data source comprises a second portion from the data table, and wherein storing the first data segment in the intermediary local data source comprises:

identifying the intermediary local data source from a plurality of intermediary local data sources based on the data table; and in response to identifying the intermediary local data source, storing the first data segment in the intermediary local data source.

13. The computer-implemented method of claim 1, wherein the intermediary local data source is a cache memory.

14. The computer-implemented method of claim 1, wherein the time period corresponds to an increased access frequency for the first data segment.

15. The computer-implemented method of claim 1, wherein storing the first data segment in the intermediary local data source comprises:

generating the intermediary local data source based on the time period corresponding to the access frequency.

16. The computer-implemented method of claim 1, wherein redirecting the subsequent federated query comprises:

providing a data segment pointer for the first data segment to a federated query engine, wherein the data segment pointer identifies the intermediary local data source for the first data segment.

17. The computer-implemented method of claim 1, wherein redirecting the subsequent federated query comprises:

receiving the subsequent federated query, wherein the subsequent federated query comprises a reference to the first data segment; and modifying the reference to the first data segment to identify the intermediary local data source.

18. A system comprising:

one or more processors; and at least one memory storing processor-executable instructions that, when collectively or independently executed by any one or more of the one or more processors, comprise causing the one or more processors to:

determine a relative priority for a first data segment of a first third-party data source based on a federated query, wherein the federated query references a second data segment from a second third-party data source, and wherein the relative priority indicates a priority of the first data segment relative to the second data segment based on at least one of an access frequency for the first data segment or a time period corresponding to the access frequency; and in response to a determination that the relative priority satisfies a priority threshold, (i) store the first data segment in an intermediary local data source; and (ii) initiate a performance of redirecting a subsequent federated query associated with the first data segment to the intermediary local data source.

19. One or more non-transitory computer-readable storage media including instructions that, when executed by one or more processors, cause the one or more processors to:

determine a relative priority for a first data segment of a first third-party data source based on a federated query, wherein the federated query references a second data segment from a second third-party data source, and wherein the relative priority indicates a priority of the first data segment relative to the second data segment based on at least one of an access frequency for the first data segment or a time period corresponding to the access frequency; and in response to a determination that the relative priority satisfies a priority threshold,
 (i) store the first data segment in an intermediary local data source; and
 (ii) initiate a performance of redirecting a subsequent federated query associated with the first data segment to the intermediary local data source.

* * * * *